US008423066B2

(12) United States Patent
DeLuca

(10) Patent No.: US 8,423,066 B2
(45) Date of Patent: Apr. 16, 2013

(54) METHOD AND APPARATUS FOR OPPORTUNISTIC COMMUNICATION SCHEDULING IN A WIRELESS COMMUNICATION NETWORK USING MOTION INFORMATION

(75) Inventor: Michael Joseph DeLuca, Boca Raton, FL (US)

(73) Assignee: Research In Motion Limited, Waterloo (CA)

( * ) Notice: Subject to any disclaimer, the term of this patent is extended or adjusted under 35 U.S.C. 154(b) by 555 days.

(21) Appl. No.: 12/710,935

(22) Filed: Feb. 23, 2010

(65) Prior Publication Data

US 2011/0207489 A1   Aug. 25, 2011

(51) Int. Cl.
*H04B 7/00* (2006.01)

(52) U.S. Cl.
USPC ........ 455/509; 455/464; 455/452.2; 455/450; 455/135; 370/252; 370/332

(58) Field of Classification Search ............... 455/509, 455/422.1, 436, 517, 512, 450, 451, 452.1, 455/452.2, 420, 434, 464, 67.11, 67.16, 135, 455/222, 226.3, 277.2, 283, 506; 370/252, 370/331, 208, 320, 329, 332; 375/260, 259
See application file for complete search history.

(56) References Cited

U.S. PATENT DOCUMENTS

| 6,288,674 | B1 | 9/2001 | Sengupta et al. | |
|---|---|---|---|---|
| 6,505,053 | B1 | 1/2003 | Winters et al. | |
| 7,450,602 | B2 | 11/2008 | Vazquez Castro | |
| 2002/0097686 | A1* | 7/2002 | Qiu | 370/252 |
| 2007/0064641 | A1* | 3/2007 | Laroia et al. | 370/320 |
| 2007/0201400 | A1 | 8/2007 | Kang et al. | |
| 2007/0280164 | A1 | 12/2007 | Hayashi | |
| 2008/0205333 | A1* | 8/2008 | Budianu et al. | 370/329 |
| 2008/0233945 | A1* | 9/2008 | Gummadi et al. | 455/422.1 |
| 2008/0233958 | A1* | 9/2008 | Robbins et al. | 455/436 |
| 2008/0247340 | A1 | 10/2008 | Choi | |
| 2009/0225716 | A1 | 9/2009 | Chen et al. | |
| 2011/0021234 | A1* | 1/2011 | Tibbitts et al. | 455/517 |
| 2012/0069759 | A1* | 3/2012 | Gummadi et al. | 370/252 |

FOREIGN PATENT DOCUMENTS

| EP | 1962434 A1 | 8/2008 |
|---|---|---|
| WO | 2007129939 A1 | 11/2007 |
| WO | 2008127165 A1 | 10/2008 |

OTHER PUBLICATIONS

Lopez-Perez et al. "OFDMA femtocells: a roadmap on interference avoidance (topics in radio communications)" IEEE Communications Magazine, IEEE Service Center, Piscataway, US, vol. 47, No. 9, Sep. 1, 2009, pp. 41-48.

(Continued)

*Primary Examiner* — Tan Trinh
(74) *Attorney, Agent, or Firm* — Novak Druce Connolly Bove + Quigg LLP

(57) ABSTRACT

A method, wireless communication device, and computer program product are provided for scheduling wireless communication between a base station and one or more mobile wireless communication devices. Signals indicative of motion are obtained and utilized to facilitate scheduling operations. In some embodiments, signals indicative of motion are used in estimation or prediction of variable conditions of the common radio medium, and scheduling, such as opportunistic scheduling, is performed based at least in part on the estimates or predictions. Signals indicative of motion may be obtained from GPS data, accelerometer data or other data generated at a mobile wireless communication device.

22 Claims, 6 Drawing Sheets

OTHER PUBLICATIONS

Mills et al. "The Impact of MS Velocity on the Performance of Frequency Selective Scheduling in IEEE 802.16e Mobile WiMAX" Consumer Communications and Networking Conference (CCNC), 2010 7th IEEE, IEEE, Piscataway, NJ, USA, Jan. 9, 2010, pp. 1-5.

Syed, Hussain Ali, Optimal and Approximate Mobility-Assisted Opportunistic Scheduling in Cellular Networks. IEEE Transactions on Mobile Computing , vol. 6, No. 6, Jun. 2007.

International Search Report mailed Jun. 22, 2011. In corresponding application No. PCT/CA2011/050110.

Extended European Search report mailed Aug. 2, 2010. In corresponding applicaation No. 10154421.1.

Diao, Z. and Li, V. "Fading-Aware Packet Scheduling Algorithm in OFDM-MIMO Systems," EURASIP Journal on Wireless Communications and Networking, vol. 2007, Article ID 95917.

Liu, X., Chong. E., and Shroff, N. "A Framework for Opportunistic Scheduling in Wireless Networks" Computer Networks Journal (Elsevier), vol. 41, No. 4, p. 451-474, 2003.

Pokhariyal, A. et al. "Frequency Domain Packet Scheduling Under Fractional Load for the UTRAN LTE Downlink" Proceedings of the 65$^{th}$ IEEE Vehicular Technology Conference, Apr. 2007, pp. 699-703.

Pokhariyal, A. et al. "HARQ Aware Frequency Domain Packet Scheduler with Different Degrees of Fairness for the UTRAN Long Term Evolution" Proceedings of the 65$^{th}$ IEEE Vehicular Technology Conference, Apr. 2007, pp. 2761-2765.

Shariat, M., Quddus, A. and Tafazolli, R. "Distance-incorporated opportunistic scheduling" by Proceedings of the 2009 International Conference on Wireless Communications and Mobile Computing.

Smalley, D. "Equalization Concepts: A Tutorial Application Report" Atlanta Regional Technology Center, SPRA140, Oct. 1994.

Somasegaran , L. "Channel Estimation and Prediction in UMTS LTE" Aalborg University, Institute of Electronic Systems, Signal and Information Processing for Communications, 2007.

Sorrentino, S. and Spagnolini, U. "A Predictive Opportunistic Scheduler for 4G Wireless Systems" *Mobile and Wireless Communications Summit*, 2007. 16th IST, Jul. 1-5, 2007, pp. 1-5.

Zemen, T. et al., "Minimum-Energy Band-Limited Predictor With Dynamic Subspace Selection for Time-Variant Flat-Fading Channels," IEEE Transactions on Signal Processing, vol. 55, No. 9, Sep. 2007, pp. 4534-4548.

Zyren, J. "Overview of the 3GPP Long Term Evolution Physical Layer", White Paper, Jul. 2007.

\* cited by examiner

METHOD AND APPARATUS FOR OPPORTUNISTIC COMMUNICATION SCHEDULING IN A WIRELESS COMMUNICATION NETWORK USING MOTION INFORMATION

CROSS-REFERENCE TO RELATED APPLICATIONS

This is the first application filed for the present technology.

TECHNICAL FIELD

The present disclosure relates generally to resource allocation in wireless communication networks, such as multi-access networks and, in particular, to a method and apparatus for communication scheduling in a wireless communication network using information related to motion of mobile wireless communication devices thereof.

BACKGROUND

Mobile wireless communication devices such as cellular telephones, handheld PDAs, and the like, typically operate in a multi-access radio environment, for example involving communication between a base station or access point and plural mobile wireless communication devices communicatively coupled therewith, such as in a cellular network. Communication may comprise voice communication, data communication such as packet-switched communication, or the like, and may be subject to various requirements such as bandwidth or quality of service (QoS) requirements. Providing adequate levels of service in terrestrial environments can be challenging, for example due to the presence of radio interference, channel fading, and the like. Channel fading relates, for example, to attenuation of radio signals, such as carrier-modulated signals, which may be variable in time, space, radio frequency, or a combination thereof, or the like. Fading may be caused by several phenomena such as multipath or shadowing.

One approach to combat fading is to employ one or more diversity techniques. For example, when radio channel conditions are time-varying, multiuser diversity in a multi-access system may be achieved through opportunistic scheduling. Opportunistic scheduling generally involves monitoring channel qualities between the base station and one or more mobile wireless communication devices, and, at a given time, only allowing communication to occur over the best quality channels. Assuming that channel qualities vary substantially independently, there is a high probability that at least some channels will be of high quality at a given time. By using only these channels, improved spectrum utilization can be achieved for the overall system. Opportunistic scheduling has been proposed, for example, for use in the Third Generation Partnership Project (3GPP) Long Term Evolution (LTE) standard.

Practical implementations of schedulers such as opportunistic schedulers may utilize channel fading models for monitoring and predicting channel quality. For example, a two-state Markov chain stochastic channel model is proposed in "Frequency Domain Packet Scheduling Under Fractional Load for the UTRAN LTE Downlink," by A. Pokhariyal, G. Monghal, K. Pedersen, P. Morgensen, I. Kovacs, C. Rosa, and T. Kolding, in *Proceedings of the 65$^{th}$ IEEE Vehicular Technology Conference*, April 2007, pp. 699-703. As another example, "Minimum-Energy Band-Limited Predictor With Dynamic Subspace Selection for Time-Variant Flat-Fading Channels," by T. Zemen, C. Mecklenbrauker, F. Kaltenberger and B. Fleury, in IEEE Transactions on Signal Processing, September 2007, Volume 55, No. 9, pp. 4534-4548, discloses a channel prediction algorithm for wireless channels based on Slepian Sequences. Channel quality prediction may be useful when there is a delay between obtaining channel quality estimates and making channel use decisions based on those channel quality estimates.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
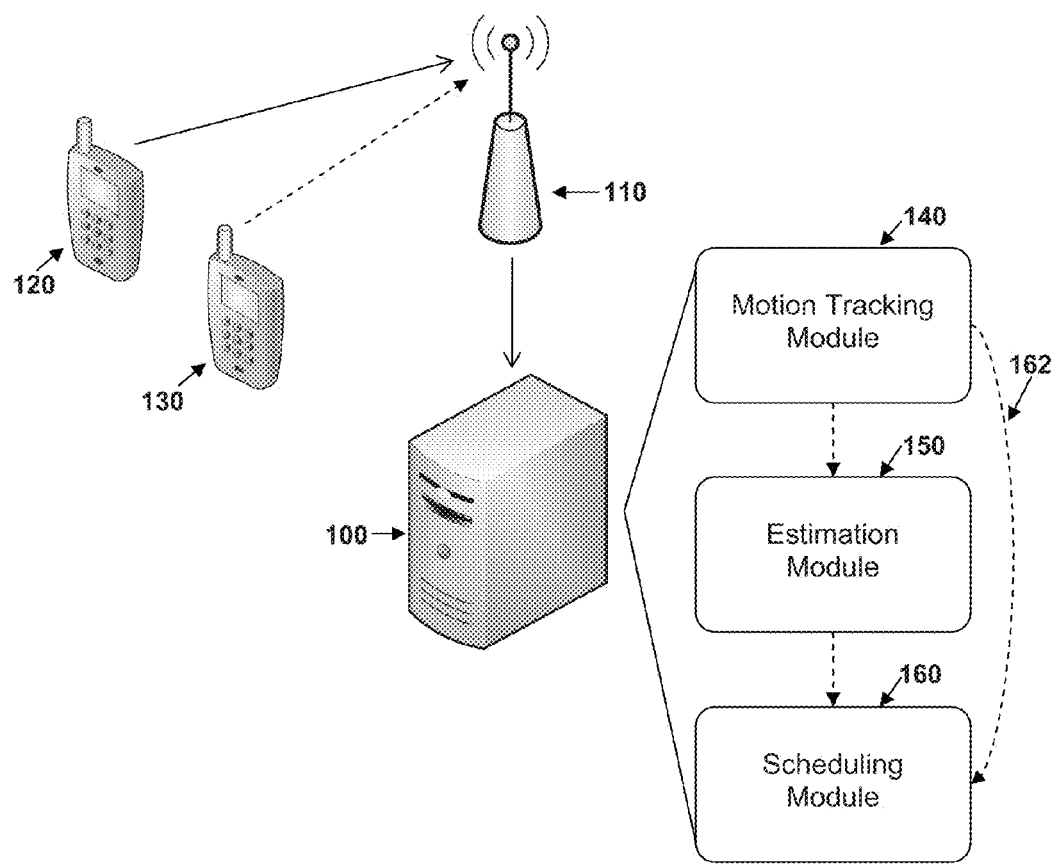
FIG. 1 illustrates an apparatus for scheduling wireless communications in accordance with embodiments of the present technology.

The present technology generally provides a method, wireless communication device, and computer program product for scheduling wireless communication over a common radio medium between a base station and one or more mobile wireless communication devices. The technology performs the scheduling based at least in part on obtained signals indicative of motion of the mobile wireless communication devices. The common radio medium may comprise a medium, such as air, through which electromagnetic radiation can propagate, possibly along with one or more reflectors or sources of multipath or shadowing phenomena, such as buildings, geographic features, vehicles, or the like, one or more sources of electromagnetic interference, sources of attenuation, or the like. The base station and mobile wireless communication device may communicate via line-of-sight paths, one or more non-line-of-sight paths, or a combination thereof. The common radio medium may exhibit one or more variable conditions, such as related to relative motion of the base station, mobile wireless communication device, reflectors, or other features of the common radio medium, or a combination thereof. The variable conditions may manifest in variable delays, signal strength, signal-to-noise ratios, bit-error rates, or other directly or indirectly observable variations in communication conditions, variable over time, location, radio frequency, or a combination thereof.

Variable conditions may be due at least in part to multipath propagation of radio signals, which may result in variable signal strength due to variations in multipath signal interference patterns. Variable conditions may additionally or alternatively be due to motion of mobile wireless communication devices or radio reflectors. Variable conditions may additionally or alternatively be due to other variable phenomena such as sources of radio interference.

Accordingly, an aspect of the present technology is a method comprising: obtaining one or more signals indicative of motion of one or more mobile wireless communication devices; and scheduling use of said common radio medium to facilitate wireless communication with the one or more wireless communication devices, wherein said scheduling is based at least in part on the one or more signals indicative of motion. In some embodiments, the method further comprises generating estimates of the one or more variable conditions based at least in part on said signals indicative of motion, and scheduling use of the common radio medium is based at least in part on the estimates. Different estimates may be specific to variable conditions relevant for communication with different mobile wireless communication devices. In some embodiments, scheduling may comprise allocating use of resources such as time slots, radio frequency bands, collections of frequency bands, or a combination thereof, such as represented by resource blocks of time slots and frequency bands, for radio communication.

Another aspect of the present technology is a computer program product comprising code adapted to perform acts associated with the foregoing method when the code is loaded into memory and executed on a processor of an appropriate wireless communication device, such as a mobile wireless communication device, base station, or on plural processors associated with plural wireless communication devices.

Yet another aspect of the present technology is an apparatus for scheduling wireless communication, the apparatus comprising: a motion tracking module configured to obtain one or more signals indicative of motion of one or more mobile wireless communication devices; and a scheduling module operatively coupled to the motion tracking module, the scheduling module configured to schedule use of said common radio medium to facilitate wireless communication with the one or more mobile wireless communication devices, wherein said scheduling is based at least in part on the one or more signals indicative of motion. In some embodiments, the apparatus further comprises an estimation module operatively coupled between the motion tracking module and the scheduling module, the estimation module configured to generate estimates of the one or more variable conditions based at least in part on said one or more signals indicative of motion, and wherein scheduling is based at least in part on the estimate of the one or more variable conditions generated by the estimation module. Different estimates may be specific to variable conditions relevant for communication with different mobile wireless communication devices.

The details and particulars of these aspects of the technology will now be described below, by way of example, with reference to the attached drawings.

FIG. 1 illustrates an apparatus 100 for scheduling wireless communication over a common radio medium between a base station and one or more mobile wireless communication devices 120, 130, in accordance with an embodiment of the present technology. The apparatus 100 is operatively coupled to a radio transceiver 110 or other appropriate equipment of the base station.

The apparatus 100 comprises a motion tracking module 140 configured to obtain one or more signals indicative of motion of one or more mobile wireless communication devices 120, 130. For example, the motion tracking module 140 may comprise a computer or microprocessor operatively coupled to a base station radio transceiver 110, the motion tracking module configured to obtain signals indicative of motion at least in part due to wireless transmission from the mobile wireless communication devices 120, 130. The mobile wireless communication devices 120, 130 may utilize one or more motion sensors, such as accelerometers, location identification modules such as a GPS receiver or other satellite-based navigation system, or other motion-sensitive technology, or a combination thereof, for generating signals indicative of motion included in the wireless transmissions.

In some embodiments, the motion tracking module 140 may be configured to obtain signals indicative of motion at least in part via one or more processing operations performed thereby. For example, signals indicative of displacement, acceleration or velocity, obtained or received from mobile wireless communication devices, may be processed or filtered to identify trends, average values, predictions, patterns, periodicities, or the like. Processing of motion-based signals may be performed by the motion tracking module 140, the mobile wireless communication devices 120, 130, or both.

The apparatus 100 further comprises a scheduling module 160 operatively coupled to the motion tracking module either directly via path 162 or via an optional estimation module 150 operatively coupled between the motion tracking module 140 and the scheduling module 160. The scheduling module 160 is configured to schedule use of said common radio medium to facilitate wireless communication. Scheduling may be based at least in part on the signals indicative of motion, estimates of the one or more variable conditions, or a combination thereof. For example, scheduling may comprise scheduling usage of resources such as time slots, frequency bands, collections of frequency sub-bands, or a combination thereof, for example as associated with resource blocks, for use in communication between the base station and one or more mobile wireless communication devices. Scheduling may be directed toward uplink communication, downlink communication, or a combination thereof, and may comprise scheduling of resources to facilitate communication in a multi-access system. In some embodiments, scheduling may be configured to take advantage of temporarily favourable variations in one or more variable conditions of the common radio medium, for example as in opportunistic scheduling.

In some embodiments, the apparatus 100 comprises an estimation module 150 operatively coupled to the motion tracking module 140. The estimation module 150 is configured to generate an estimate of one or more variable conditions of the common radio medium via which wireless communications are propagated between the base station and the mobile wireless communication devices, the estimate based at least in part on the signals indicative of motion obtained by the motion tracking module 140. For example, the estimation module 150 may be configured to estimate one or more present conditions, future conditions or trends, or a combination thereof, of the common radio medium based on one or more models, filters, neural networks, inference engines, decision modules, Bayesian networks, Markov random fields, associations, or the like. The estimation module 150 may utilize predetermined aspects of the signals indicative of motion to adjust one or more inputs to said models, filters, associations, or the like, for example to adjust input variables, parameters, initial conditions, or the like, thereof. The estimation module 150 may also utilize other information, such as channel quality indicators (CQIs), received signal strength indicators (RSSIs), measured bit-error rates (BERs), or the like, in generating estimates of the variable conditions of the common radio medium.

In some embodiments, the scheduling module 160 may be operatively coupled directly to the motion tracking module 140 via path 162, and may perform scheduling based on the signals indicative of motion obtained thereby. In this case, aspects optionally performed by the estimation module 150 may be implicitly performed, for example by the motion tracking module 140, the scheduling module 160, or a combination thereof.

The scheduling module 160 may be operatively coupled to one or more transmission control components associated with the wireless communication network for implementation of a schedule determined thereby. For example, the scheduling module may be operatively coupled to transmission control components of the base station associated therewith, for example via one or more control lines, data communication sessions, or the like, and configured to influence scheduling of wireless transmissions performed thereby. The scheduling module may additionally or alternatively be operatively coupled to transmission control components of one or more mobile wireless communication devices, for example via a wireless control channel, and configured to influence scheduling of wireless transmissions performed thereby.

The apparatus 100 may comprise one or more electronic components configured to support operation of the various modules thereof, such as one or more computers, or electronic systems comprising components such as microprocessors, memory, digital signal processors, application-specific integrated circuits (ASICs), digital input/output devices, and the like. Memory may be volatile or non-volatile memory, or a combination thereof, and may store instructions or software for performing operations associated with the apparatus 100.

Figure 2:
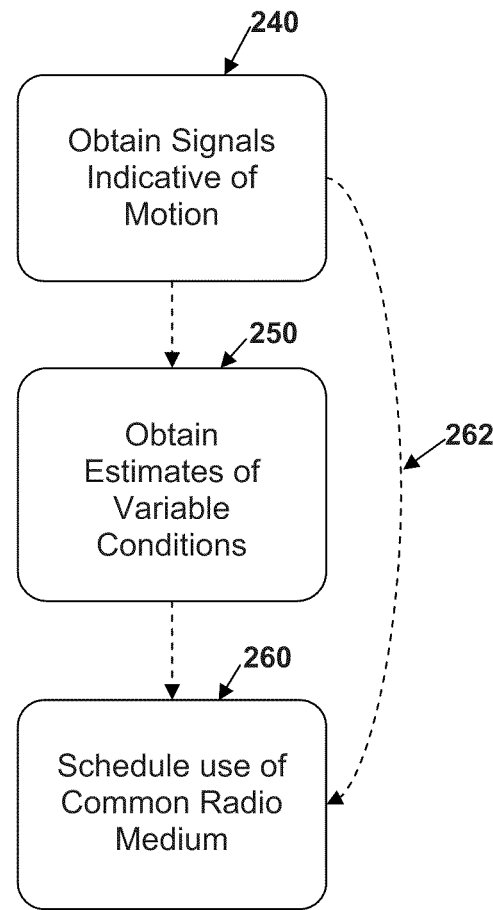
FIG. 2 illustrates a method for scheduling wireless communications in accordance with embodiments of the present technology.

FIG. 2 illustrates a method for scheduling wireless communications over a common radio medium between a base station and one or more mobile wireless communication devices in accordance with an embodiment of the present technology. The method comprises obtaining 240 signals indicative of motion of one or more mobile wireless communication devices. In some embodiments, the method may further comprise obtaining 250 an estimate of the one or more variable conditions based at least in part on the obtained signals. The method further comprises scheduling 260 use of said common radio medium to facilitate wireless communication with the one or more mobile wireless communication devices, wherein said scheduling is based at least in part on the estimate of the one or more variable conditions, or alternatively on the signal indicative of motion, or both. For example, in some embodiments, the method comprises performing scheduling 260 based at least in part on the obtained 240 signals via path 262. The method illustrated in FIG. 2 may be implemented by one or more computers or electronics such as comprising one or more microprocessors, ASICs, digital signal processors, or the like, configured in accordance with instructions stored in hardware, software, firmware, or a combination thereof.

Acts associated with methods described herein can be implemented as coded instructions in a computer program product. In other words, the computer program product is a computer-readable medium upon which software code is recorded to execute the method when the computer program product is loaded into memory and executed on the microprocessor of an appropriate wireless communication device.

Acts associated with certain methods described herein can be implemented as coded instructions in plural computer program products. For example, acts such as generating motion-based signals based on information acquired by location identification modules, motion sensors, or the like, may be associated with a mobile wireless communication device containing such location identification modules or motion sensors, while acts such as receiving and processing motion-based signals and performing scheduling based thereon may be associated with a base station. In this case, each computer program product may be a computer-readable medium upon which software code is recorded to execute appropriate portions of the method when a computer program product is loaded into memory and executed on the microprocessor of a wireless communication device.

A portion of certain methods described herein can be implemented on a wireless communication device having appropriate communication capabilities, such as voice communication capabilities, data communication capabilities, or a combination thereof. The term "wireless communication device", for the purposes of this specification, shall include mobile wireless communication devices such as a wireless handheld, smart phone, PDA, tablet, laptop, netbook, and base station devices such as a cellular or other wireless base station, wireless access point, LTE eNodeB, or other communication device that is capable of transmission, reception, or both, via a wireless communication medium such as radio.

Obtaining Motion Information

Aspects of the present technology comprise obtaining one or more signals indicative of motion of one or more mobile wireless communication devices. For example, one or more signals indicative of motion of one or more mobile wireless communication devices may be generated thereby and communicated wirelessly to a base station. The signals may be utilized by computer equipment operatively coupled to the base station for estimation of variable channel conditions, for performing scheduling, or a combination thereof. Signals indicative of motion may comprise one or more types of motion information encoded therein.

In some embodiments, a mobile wireless communication device is configured to obtain motion information indicative of location, displacement, velocity, acceleration, or the like, or a combination thereof, via operation of a location identification module, such as a GPS receiver, or motion sensors such as one or more accelerometers. For example, motion information may comprise a sequence of sampled location, velocity, or acceleration values, which may be averaged, filtered, differentiated, integrated, or the like, or a combination thereof.

As an example, location information of a mobile wireless communication device may be determined by a satellite-based location identification module, such as a GPS receiver integrated into or operatively coupled with a mobile wireless communication device. Location information may be determined at a plurality of times and processed to provide motion information. For example, locations $l_1$ and $l_2$ may be determined at times $t_1$ and $t_2$, respectively, where the locations $l_1$ and $l_2$ are expressed in a coordinate system, such as the World Geodetic System (WGS 84), and the times are $t_1$ and $t_2$ are expressed in a temporal system such as Coordinated Universal Time (UTC). Motion information may be derived from the location information as an average velocity, for example by dividing the change in location $(l_2-l_1)$ by the change in time $(t_2-t_1)$.

As another example, a motion sensor such as an accelerometer, integrated into or operatively coupled with a wireless communication device may be configured to provide acceleration data which may be processed to provide motion information. Processing may comprise averaging, integrating, filtering, or the like. For example, sampled acceleration values may provide information about displacement, velocity or other motion information.

Figure 3:
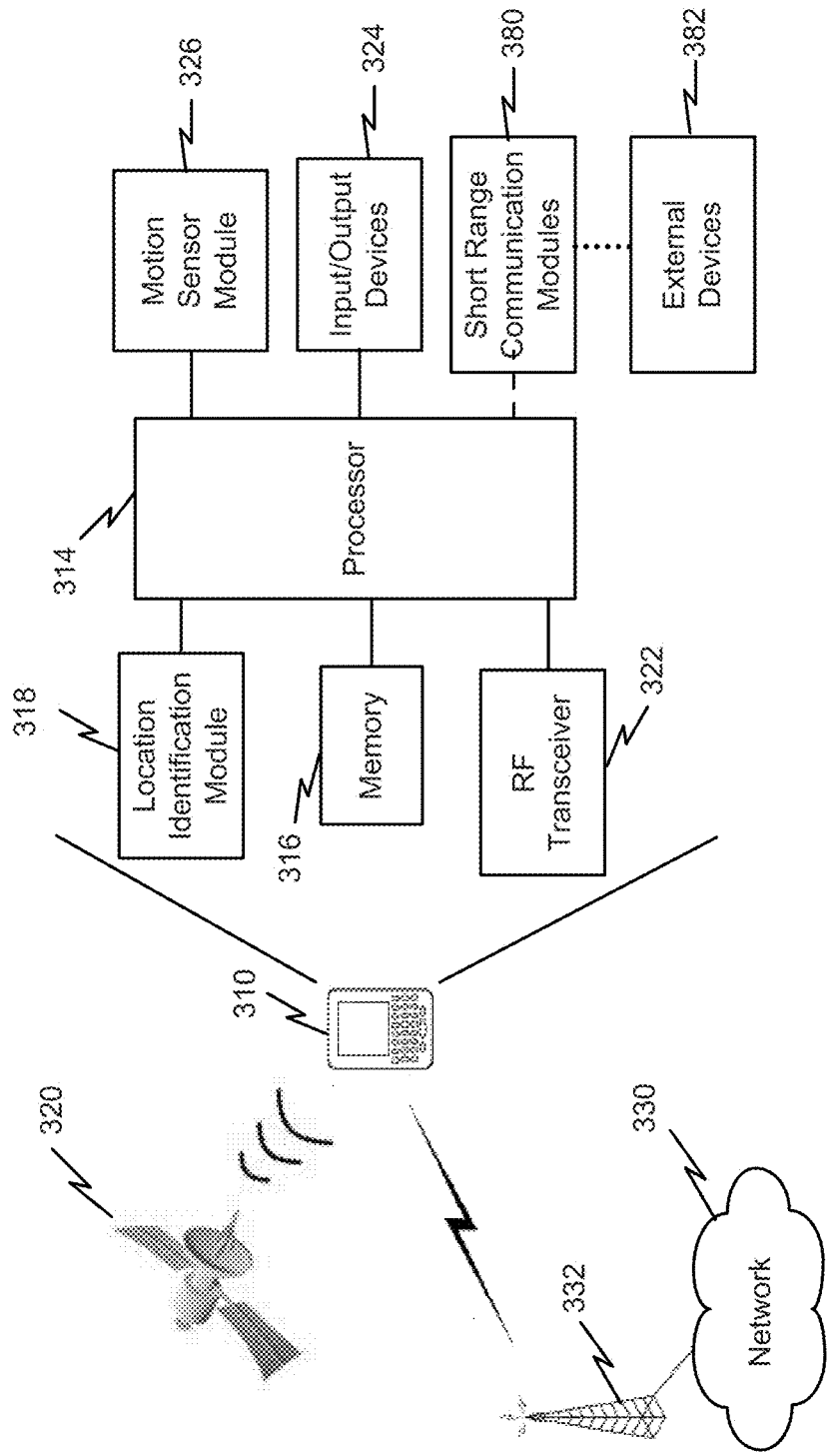
FIG. 3 illustrates a block diagram of an exemplary wireless communication device.

FIG. 3 shows a block diagram depicting certain main components of an exemplary mobile wireless communication device 310. It should be understood that this figure is intentionally simplified to show only certain components; the mobile wireless communication device 310 may include other components beyond those shown in FIG. 3.

The mobile wireless communication device 310 may be operatively associated with a GPS system 320 allowing for determining its location. The mobile wireless communication device 310 is linked to a cellular network 330 through a base-station 332. Alternatively, other satellite, pseudo-satellite, ground-based or combined positioning systems may be used in place of the GPS system 320.

The mobile wireless communication device 310 further comprises a location identification module 318, which is configured to determine the location of the mobile wireless communication device, motion of the mobile wireless communication device, or a combination thereof. In some embodiments, the location identification module 318 includes a GPS receiver chipset for receiving GPS radio signals transmitted from the one or more orbiting GPS satellites of the GPS system 320. The GPS receiver chipset can be embedded within the mobile wireless communication device or externally connected, such as, for example, a Bluetooth™ GPS puck or dongle. Other systems for determining location may be used in place of GPS, as would be readily understood by a worker skilled in the art.

The mobile wireless communication device 310 optionally includes one or more motion sensors in a motion sensor module 326 such as an accelerometer or an array thereof. Accelerometers may be, for example, piezo-electric accelerometers, micro electro-mechanical (MEMS) accelerometers, capacitive accelerometers, shear mode accelerometers, thermal accelerometers, surface acoustic wave accelerometers, laser accelerometers, pendulating integrating gyroscopic (PIGA) accelerometers, MEMs gyroscopes or the like. An accelerometer or array thereof may be configured to detect acceleration along one or more predetermined spatial directions, and output an electrical signal proportional to such acceleration, proportional to average acceleration, or proportional to a single or double integral of acceleration, which may be indicative of a velocity or displacement of the accelerometer, respectively. In some embodiments, the one or more motion sensors may comprise other motion sensor technology, such as optical or camera-based motion sensors, microphones, sensors for detecting motion through an electric or magnetic field, such as Hall-effect sensors, gyroscopic motion sensors, or the like. A combination of sensor types may be utilized to provide adequate motion-sensing capabilities by the motion sensor module 326. For example, in situations where a sensor of a first type is deemed to be inadequate due to inherent limitations thereof, a sensor of a second type may be used. In some embodiments, motion sensor module 326 may also be configured to operate with a user interface. Motions intended to provide gesture-based device input may be separated from other motion of the device, for example via filtering.

The mobile wireless communication device 310 comprises a processing module, which includes a microprocessor 314 (or simply a "processor") and operatively associated memory 316 (in the form of RAM or flash memory or both), to enable a variety of device functions and to execute an operating system for running software applications loaded on the mobile wireless communication device 310.

The mobile wireless communication device 310 includes a radiofrequency (RF) transceiver 322 for communicating wirelessly with the base station 332 of a wireless network 330. The base station 332 may be a cellular base station, wireless access point, or the like. The base station 332 may vary as the wireless device travels, for example, using handoff processes in cellular networks. The RF transceiver 322 may optionally, alternatively or additionally be used for communicating directly with a peer device such as a third party wireless communication device, for example as may occur in some ad-hoc networks. The RF transceiver enables access to a wireless communication channel for transmitting and receiving data. The RF transceiver 322 may further allow for a wireless voice channel for transmitting and receiving voice communications, for example concurrently with transmission and reception of data over the same or a separate logical or physical channel.

The mobile wireless communication device 310 sends and receives communication signals via the RF transceiver 322. When communicating wirelessly with a base station 332 of a wireless network 330, the mobile wireless communication device 310 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the mobile wireless communication device 310 is capable of operation using multiple protocols. The base station 332 may be part of a wireless network, such as a cellular network, local-area network, wide-area network, wireless hotspot network, or the like. The mobile wireless communication device 310, base station 332, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

The mobile wireless communications device 310 comprises one or more input/output devices or user interfaces (UI's) 324. The mobile wireless communications device 310 may include one or more of the following: a display (e.g. a small LCD screen), a thumbwheel and/or trackball, a keyboard, a touch screen, a keypad, a button, a speaker, a still camera and a video camera.

The mobile wireless communications device 310 may also comprise other components such as short-range communication modules 380 for communication between the mobile wireless communications device and other similarly enabled external devices 382. For example, short-range communication modules 380 may include a Bluetooth communication module.

In some embodiments, signals indicative of motion may comprise quantitative motion information, qualitative motion information, or a combination thereof. For example, quantitative motion information may include information such as displacement, velocity, speed, direction, acceleration, measurements related to periodicity or other patterns or variation thereof, or the like. Qualitative motion information may include information such as presence or absence of one or more predetermined patterns of motion, information indicative of whether the mobile wireless communication device is indoors, outdoors, underground, in a vehicle, or other information indicative or derived at least in part from location identification modules, motion sensors, or the like. Motion information may comprise both qualitative and quantitative motion information, for example motion information may be indicative of a probability or likelihood of the presence of one or more predetermined qualities of motion.

In some embodiments, signals indicative of motion, or motion information thereof, may be processed by one or more computer processors associated with one or more mobile wireless communication devices, base stations, or a combination thereof. A computer processor may be associated with a motion tracking module of the base station, for example. Instructions for executing processing operations may be stored in volatile or non-volatile memory of the mobile wireless communication devices, base stations, or both. Processing may comprise use of look-up tables, signal processing or filtering algorithms, implementation of mathematical functions, operation of a neural network, inference engine, Bayesian network, particle filter, Kalman filter, Hidden Markov Model (HMM) filter, or other processing operations configured to provide quantitative motion information, qualitative motion information, or a combination thereof, based on information obtained from GPS devices, accelerometer devices, or other motion input devices, possibly along with other information such as information indicative of radio signal strength, channel quality, latency, signal-to-noise ratio, fading statistics, bit error rates, or the like.

In some embodiments, one or more signals indicative of motion comprising motion information obtained by a mobile wireless communication device may be wirelessly transmitted to a base station, for example periodically. The one or more signals indicative of motion may be transmitted as one or more data packets addressed to a motion tracking module associated with a scheduling module, for example at the base station. In some embodiments, the data packets may be transmitted in the context of a regular data communication session supported by the wireless communication network. In some embodiments, the data packets may be transmitted as control information over a control channel. In some embodiments, signals indicative of motion may be communicated from a mobile wireless communication device to a base station analogously to how channel quality information (CQI) is transmitted in wireless standards such as LTE. This configuration may be included into one or more wireless communication standards, such as an LTE standard, for example.

In some embodiments, signals indicative of motion may be transmitted in accordance with a schedule, level of detail, or the like, which may be controllable by the transmitting mobile wireless communication device, base station, or the like. This may facilitate control over the amount of communication overhead required for obtaining motion information. For example, if it is determined that a scheduling module, estimation module, or both, requires motion information to have a specified amount of precision, the amount of data carried by signals indicative of motion may be adjusted so as to approximately provide the required amount of motion information.

Estimating Radio Conditions

Embodiments of the present technology may comprise explicit or implicit estimation of variable conditions of a common radio medium between two or more wireless communication devices, such as between a base station and one or more mobile wireless communication devices communicatively coupled thereto. One or more estimates of the variable conditions may be generated, based at least in part on one or more obtained signals indicative of motion. For example, the estimates may be generated by one or more computer microprocessors operatively coupled to memory containing instructions for performing processing operations, for example as associated with an estimation module associated with a wireless or cellular base station. For example, signal-to-noise ratio (SNR), bit-error rate (BER), or the like, related to communication between a base station and a mobile wireless communication device may be a variable condition, for example due to multipath fading, radio interference, or the like. Different variable conditions may be specific to one or more of a plurality of mobile wireless communication devices. In some embodiments, generating estimates of variable conditions may be performed at least in part at a mobile wireless communication device.

In some embodiments, estimation of variable conditions comprises prediction of upcoming conditions. For example, conditions during an upcoming time interval may be predicted based at least in part on past and present information, conditions in a spatial region corresponding to a predicted location of a mobile wireless communication device may be predicted, or the like, or a combination thereof.

In some embodiments, due to latency between observing variable radio conditions and performing communication acts based on said observations, scheduling may be performed based on predictions of variable radio conditions at one or more predetermined future times.

In some embodiments, for example if variable radio conditions vary slowly relative to scheduling operations, future scheduling may be performed based on estimates of present radio conditions, since present radio conditions may provide an acceptably accurate estimate of upcoming radio conditions, at least for a predetermined time interval into the future.

In some embodiments, motion information may be used at least in part for predicting a rate of variation of variable radio conditions. For example, a faster moving mobile wireless communication device may be predicted to experience more frequent and shorter fading events than a slower moving mobile wireless communication device.

In some embodiments, generating estimates of variable conditions of the common radio medium based at least in part on signals indicative of motion may comprise processing the one or more signals indicative of motion, optionally along with other information pertaining to one or more wireless channels, such as information indicative of radio signal strength, signal-to-noise ratio, fading statistics, bit error rates, or the like, in accordance with a predetermined model or algorithm implemented by one or more computers or electronics such as comprising one or more microprocessors, ASICs, digital signal processors, or the like, configured in accordance with instructions stored in hardware, software, firmware, or a combination thereof. In some embodiments, processing may be performed by an estimation module associated with the base station.

In some embodiments, signals indicative of motion may be used to select between two or more models, techniques, estimation processes, or approaches for estimating variable conditions of the common radio medium. For example, the magnitude of a relative velocity between a mobile wireless communication device and the base station may be compared with one or more predetermined threshold values, and a predetermined appropriate model, technique or approach for estimating variable conditions of the common radio medium, such as fading conditions, may be selected based on said comparison.

In some embodiments, signals indicative of motion may comprise velocity information which may be provided as input to a computer-based Rayleigh fading channel model or other channel model such as a Rician, Weibull or Nakagami fading model. For example, for a Rayleigh fading model, the frequency and duration of fading events may be proportional to relative velocity between communicatively coupled mobile wireless communication devices. Therefore, in some embodiments, signals indicative of motion may be used to facilitate estimation of frequency and duration of fading events. In such an environment an opportunistic scheduler may be configured to avoid scheduling communication, or adjust communication scheduling, in response to an estimation that a fade sufficient enough to result in communication errors was about to occur. In some embodiments, selection of a channel estimation process may comprise selection of a channel fading model, based at least in part on signals indicative of motion.

In some embodiments, signals indicative of motion may be used in estimation of an environment of the mobile wireless communication device. For example, a processed signal indicative of motion may comprise an indication or inference that the mobile wireless communication device is moving only in a confined region such as a building, or that a GPS signal or other satellite-based signal forming a basis of a signal indicative of motion is weak, thereby indicating that the mobile wireless communication device may be underground or indoors. In some embodiments, based on the estimated environment, an estimation process, model, technique, or approach for estimating variable conditions of the common radio medium may be selected. For example, a different fading model may be selected for estimation or prediction of fading conditions when a mobile wireless communication device is indoors than when the mobile wireless communication device is outdoors. In some embodiments, a scheduling method or parameters related to a scheduling method may be selected based on aspects of the estimated environment.

In some embodiments, different estimates of variable conditions of the common radio medium between the base station and two or more mobile wireless communication devices may be generated substantially independently. For example, variable conditions related to potential or actual communication links, such as SNR, between the base station and two or more mobile wireless communication devices may be estimated substantially independently for each mobile wireless communication device.

In some embodiments, estimates of variable conditions of the common radio medium between the base station and two or more mobile wireless communication devices may be generated interdependently. For example, estimates of first variable conditions of the common radio medium associated with communication between the base station and a first mobile wireless communication device may be used to adjust estimates of second variable conditions of the common radio medium associated with communication between the base station and a second mobile wireless communication device in accordance with one or more predetermined model properties indicative that the first and second variable conditions should be substantially similar, or substantially correlated in one or more aspects. For example, if two mobile wireless communication devices are near each other, they may be expected to experience similarities in relevant conditions such as SNR or BER.

In some embodiments, estimation of variable conditions is not performed explicitly, but may be implicitly incorporated into scheduling or resource allocation operations. For example, if a signal indicative of motion of a mobile indicates the mobile wireless communication device is moving at a velocity above a predetermined threshold, scheduling may be adjusted to accommodate at least a predetermined fade rate in the common radio medium between the base station and said mobile wireless communication device. The assumption, implicitly incorporated into this embodiment, is that the high velocity is correlated with relatively rapid fading. As another example, if, based on a signal indicative of motion, a mobile wireless communication device is determined to likely be indoors or underground, scheduling or resource allocation may be adjusted to facilitate enhanced building penetration, for example by appropriate selection of frequencies or time slots or data rates. In other words, scheduling may be adjusted based on motion information without mandating explicit calculations or estimations of variable conditions of the common radio medium.

Scheduling

Aspects of the present technology relate to radio resource allocation. For example, radio resources such as time slots, radio frequencies, collections of orthogonal or non-orthogonal radio frequency bands or sub-bands, or the like, or a combination thereof, may be allocated to support one or more communication links between plural wireless communication devices. The term "scheduling" is used to refer to a variety of radio resource allocation approaches. For example, a cellular base station may perform scheduling of available radio frequencies, time slots, data rates, or a combination thereof, to support communication with plural mobile wireless communication devices, such as cellular telephones. In some embodiments, as radio frequencies are typically simultaneously usable to support only a limited number of communications, scheduling may comprise arbitrating between plural requests for use of the same sets of resources.

Scheduling may involve use of information related to variable conditions of the common radio medium through which wireless communications are propagated between wireless communication devices. For example, one or more channel quality indicators (CQIs) may be provided, each indicative of quality of a predetermined channel, for example as measured by signal-to-noise ratio (SNR), signal-to-interference-plus-noise ratio (SINR), bit error rate (BER), or the like. Information related to variable conditions of the common radio medium may be based, at least in part, implicitly, explicitly, directly or indirectly on motion information.

In accordance with embodiments of the present technology, scheduling use of the common radio medium may be performed to facilitate communications over wireless communication channels between predetermined wireless communication devices, with predetermined bandwidth, QoS or other requirements. Said scheduling may be based at least in part on one or more estimates of the one or more variable conditions of the common radio medium, or on motion information, or a combination thereof. Scheduling may be performed by a scheduling module associated with the base station. The scheduling module may comprise one or more computers or microprocessors operatively coupled to memory having instructions stored thereon for executing appropriate scheduling operations.

Scheduling approaches may be configured to achieve a desired usage of radio resources, for example as may be indicated by measures such as spectral efficiency or total communication throughput.

Scheduling may also involve use of information related to other parameters of the wireless communication system. For example, in a multi-access wireless communication system, fairness or quality of service (QoS) requirements may be addressed by temporarily or permanently prioritizing access to radio resources by some wireless communication devices at the expense of others. Queue size, resource allocation history, latency measurements, and the like, may be used to determine such prioritization.

In some embodiments, scheduling may comprise opportunistic scheduling, wherein variable radio resources are monitored and dynamically allocated such that better quality radio resources are utilized for communication before worse quality radio resources. For example, in a multi-access wireless communication system, radio resources such as one or more time slots, frequency bands or sets of frequency sub-bands, or combinations thereof, for example resource blocks, may be opportunistically scheduled for use by the wireless communication devices which are expected to make efficient use of them, possibly subject to other constraints such as fairness requirements.

Scheduling may be performed via several approaches, such as through convex optimization, water-filling algorithms, linear programming, linear integer programming, heuristic methods, or the like. In some embodiments, scheduling may be performed with the goal of obtaining a Pareto-efficient and fair utilization of spectral resources over a predetermined time interval.

In some embodiments, opportunistic scheduling may be performed in accordance with a communication standard, such as the LTE standard. For example, an Evolved NodeB (ENB) communicatively coupled to one or more mobile wireless communication devices may be configured to perform opportunistic scheduling. The opportunistic scheduling may utilize motion information obtained about the one or more mobile wireless communication devices, possibly along with other information such as channel quality information, QoS requirement information, or the like.

In some embodiments, scheduling comprises allocating present wireless communication resources, future wireless communication resources, or a combination thereof, for facilitating pending or anticipated communications between particular pairs of wireless communication devices. For example, a cellular base station or wireless access point may be communicatively coupled to plural mobile wireless communication devices, with pending or anticipated data to be communicated to or from each of the mobile wireless communication devices. A set of shared resources, such as time slots, radio frequency bands, or combinations thereof, for example as represented by resource blocks, may be utilized for wireless communication between the base station and the mobile wireless communication devices. Scheduling may comprise assigning use of resources, for example assigning use of one or more frequency bands during one or more upcoming time slots, for use in communication between the base station and a specified mobile wireless communication device.

In some embodiments, scheduling of communications to or from a mobile wireless communication device may be based at least in part on velocity information or environmental information contained in a signal indicative of motion of the mobile wireless communication device, for example as follows. If the reported velocity of the mobile wireless communication device is below a predetermined threshold, then a first scheduling method may be used, such as an opportunistic scheduling method based on estimates of variable channel conditions derived in accordance with a channel model with substantially stationary transmitter and receiver. If the reported velocity is above a predetermined threshold, for example above a walking speed, then a second scheduling method may be used, such as an opportunistic scheduling method which is configured to anticipate occurrence of fading events at a predicted rate, the rate at least in part based on the current reported velocity or predicted future velocity. The scheduling method may be configured to respond to changes in velocity by adjusting transmission scheduling if an expected improvement can be attained by such an adjustment.

In some embodiments, if the signal indicative of motion of a mobile wireless communication device comprises an indication that the mobile wireless communication device is in a building or other structure, a scheduling method for communication with the mobile wireless communication device may be configured to facilitate penetration of wireless communication signals through the building or other structure. For example, frequency bands may be preferentially utilized for transmission which are known to facilitate better communication between exterior and interior of a building.

Implementations of the present technology will now be further explained with regard to example scenarios. It should be expressly understood that these scenarios are only examples that are provided solely for the purposes of illustrating how the technology works in certain circumstances. Accordingly, these examples should not be construed as limiting any of the aspects of the technology already described above and claimed in the appended claims.

EXAMPLE 1

In some embodiments, the present technology is configured to facilitate opportunistic scheduling in a multi-access cellular wireless communication system such as the Long Term Evolution (LTE) system as described with respect to the $3^{rd}$ Generation Partnership Project (3GPP). In one embodiment, an LTE system may employ orthogonal frequency division multiple access (OFDMA) for downlink communication from the base station (sometimes termed the evolved NodeB or eNodeB) to mobile wireless communication devices such as cellular handsets, and Single Carrier FDMA (SC-FDMA) for uplink communication from the mobile wireless communication devices to the base station. LTE may support frequency division duplex (FDD) mode, time division duplex (TDD) mode, or a combination thereof. At the physical layer, LTE systems may communicate information by modulating one or more carriers, using Quadrature Phase Shift Keying (QPSK), Quadrature Amplitude Modulation (QAM), or a combination thereof, or the like. These and other details of LTE are published as standards by the $3^{rd}$ Generation Partnership Project. Embodiments of the present technology may be associated with variations on the LTE standard, or other present or future wireless communication standards and associated systems.

In some embodiments, the eNodeB is configured to dynamically schedule shared radio resources at the media access control (MAC) layer. Radio resource assignment may be based on estimated conditions of the common radio medium, communication traffic volume, QoS requirements, and the like. Radio resource assignment in the present technology is also based on motion information conveyed by signals indicative of motion of the mobile wireless communication devices. Radio resource assignment may comprise assignment of resource blocks. For example, a resource block may comprise six or seven consecutive OFDM symbols in the time domain and 12 consecutive sub-carriers in the frequency domain.

Radio resources may be assigned based on an opportunistic scheduling algorithm, which, at least in part, preferentially assigns radio resources for use by communication links which can make better use of them. For example, if a particular radio resource block can support either a first wireless communication between the eNodeB and a first mobile wireless communication device, or a second wireless communication between the eNodeB and a second mobile wireless communication device, the radio resource block may be assigned to one of the first or second wireless communication based on which communication is estimated to exhibit a better SNR. As another example, if two or more radio resource blocks can support a wireless communication between the eNodeB and a mobile wireless communication device, those radio resource blocks which are estimated to exhibit a better SNR may be assigned for supporting said communication before radio resource blocks which are estimated to exhibit a worse SNR. Preferential assignment of radio resources may be adjusted based on other criteria such as fairness or QoS criteria.

In embodiments of the present technology, estimation of channel quality may be based at least in part on one or more models such as a Rayleigh fading channel model, a Rician, Weibull, Nakagami or other fading channel model, a multipath model comprising one or more stationary reflectors, moving reflectors, or a combination thereof, or other models indicative of temporal variation in channel quality, frequency variation in channel quality, or the like. Fading may be flat fading or frequency selective fading, for example. Estimation may comprise estimation of present channel conditions, future channel conditions, temporal or frequency patterns of channel fades such as periodicity, SNR range or distribution, or the like. Estimation of channel quality may be performed based on information such as transmitted channel quality indicators (CQIs), signals indicative of motion of one or more mobile wireless communication devices, and the like.

In some embodiments, signals indicative of motion of one or more mobile wireless communication devices, for example as obtained by a motion tracking module, may be used, for example by an estimation module, in a quantitative manner, a qualitative manner, or a combination thereof.

Figure 4:
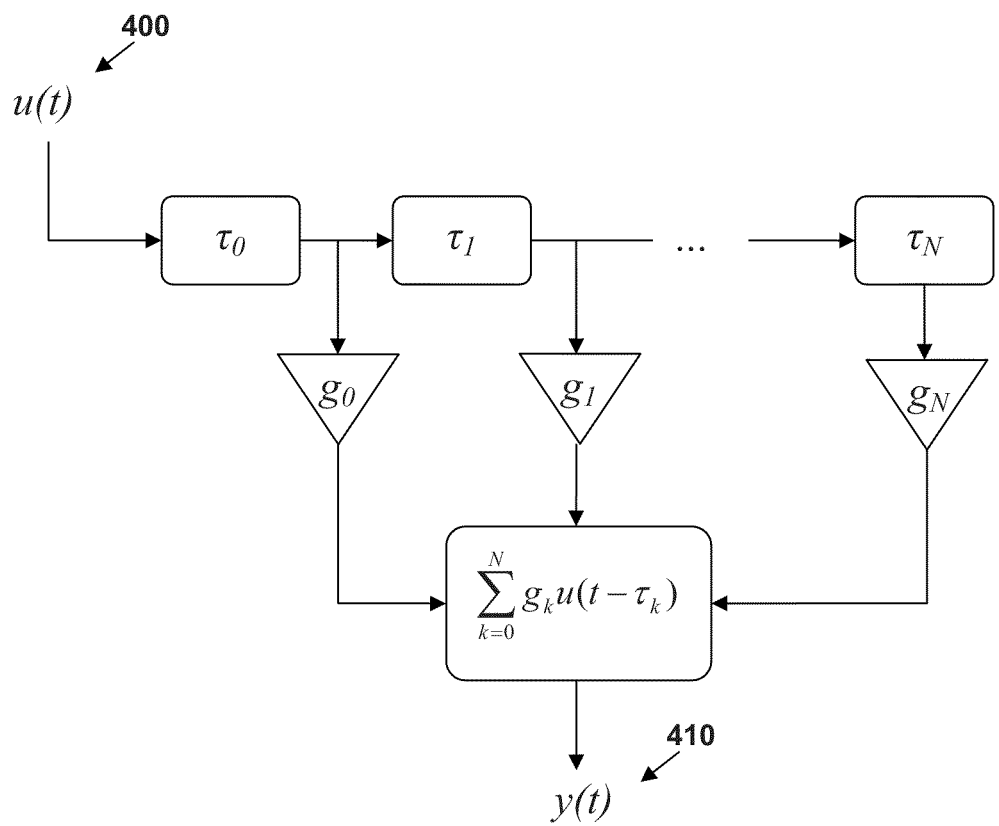
FIG. 4 illustrates a multi-tap delay line model for a multi-path reflector environment in accordance with embodiments of the present technology.

In some embodiments, a multipath reflector model of a communication path between two wireless communication devices may utilize motion information. A multipath reflector environment may be modeled by a multi-tap delay line or equivalent model, for example as illustrated in FIG. 4. As illustrated, the received signal y(t) 410 may be modeled as a superposition of several delayed and gain-adjusted copies of the transmitted signal u(t) 400. The superposition may result in fading, for example due to interference between the superimposed copies of the transmitted signal u(t) 400. Each delayed and gain-adjusted copy of the transmitted signal u(t) 400, for example $g_k u(t-\tau_k)$, represents a copy of the signal received via at least one direct or indirect path. The delay factor $\tau_k$ is proportional to the path length, which may be determined trigonometrically, for example. The gain factor $g_k$ may be indicative of factors such as distance, reflectivity, number of propagation paths having the same length, and the like. If the mobile wireless communication devices are not moving, that is their motion is substantially zero, then the delay factors $\tau_k$ and gain factors $g_k$ may be substantially constant or vary in accordance with motion of the multipath reflectors. If at least one mobile wireless communication device is moving, then the delay factors $\tau_k$ may vary as the length of the related propagation paths vary, for example in accordance with one or a superposition of trigonometric functions. Additionally, the gain factors $g_k$ may vary substantially continuously or in substantially discrete jumps. For example, a gain factor may jump change to or from zero as an associated propagation path is becomes obstructed or unobstructed, respectively. Additionally, new propagation paths, and hence new elements of the multi-tap delay model, may be added or removed as the model evolves. In some embodiments, variation in delay factors $\tau_k$, gain factors $g_k$, and the addition and removal of elements of the model may be modeled as a random process, a deterministic process, or a combination thereof, dependent at least in part on motion information. For example, the rates of change in delay factors $\tau_k$, gain factors $g_k$, and the intensity of jump changes therein and the intensity of addition and removal of elements of the model may be related to velocity of a mobile wireless communication device, for example proportional to a function thereof.

In some embodiments, a Rayleigh fading model may utilize motion information. A Rayleigh fading model may be most appropriate when there are many multipath reflectors affecting the common radio medium, but substantially no dominant line-of-sight radio propagation path. When a dominant propagation path, such as a line-of-sight path, is present, a Rician fading model may be more appropriate. In some embodiments, motion information may be used to select between fading models. For example if a signal indicative of motion comprises an indication that a mobile wireless communication device is in an urban environment, a Rayleigh fading model may be implemented, the Rayleigh fading model parameters may further be determined at least in part by motion information indicative of velocity, carried by the signal indicative of motion.

In some embodiments, for example in association with a Rayleigh fading model, motion information may be used to estimate or predict deep signal fades based on past observance of signal fades in conjunction with one or more regularity conditions. For example, for a mobile wireless communication device moving at an observed speed v and given an observation of a signal fading event at first time $t_0$, subsequent fading events may be estimated or predicted to be more likely to occur when the mobile wireless communication device has moved by a distance which is a multiple of half a wavelength of the carrier frequency $\lambda$, that is, at times $t_0+k\lambda/2v$, k=1, 2, . . . . Such estimates may be reliable for a predetermined time into the future. Other heuristics or observed tendencies toward fading patterns related to motion information may also be utilized to estimate or predict fading events in accordance with embodiments of the present technology. Correlations between fading events and motion may be predicted based on multipath models of varying complexity, for example based on presence of one, multiple, or many stationary or moving multipath reflectors. For example, Doppler spread and fade rates of fading channels may be estimated based at least in part on motion information such as velocity.

In some embodiments, scheduling of time slots used for communication with a mobile wireless communication device comprises scheduling use of time slots which do not temporally coincide with one or more estimated or predicted fading events. For example, given a prediction of periodic fading events on a communications channel coupling two wireless communication devices at times $t_0+k\Delta t$, k=0, 1, 2, . . . the two wireless communication devices may be configured to utilize the communications channel periodically in time slots substantially centered at $t_1+k\Delta t$, k=0, 1, 2, . . . , where $|t_1-t_0| \cong \Delta t/2$, or at times which are otherwise out of phase with the arrival process of fading events.

EXAMPLE 2

Figure 5:
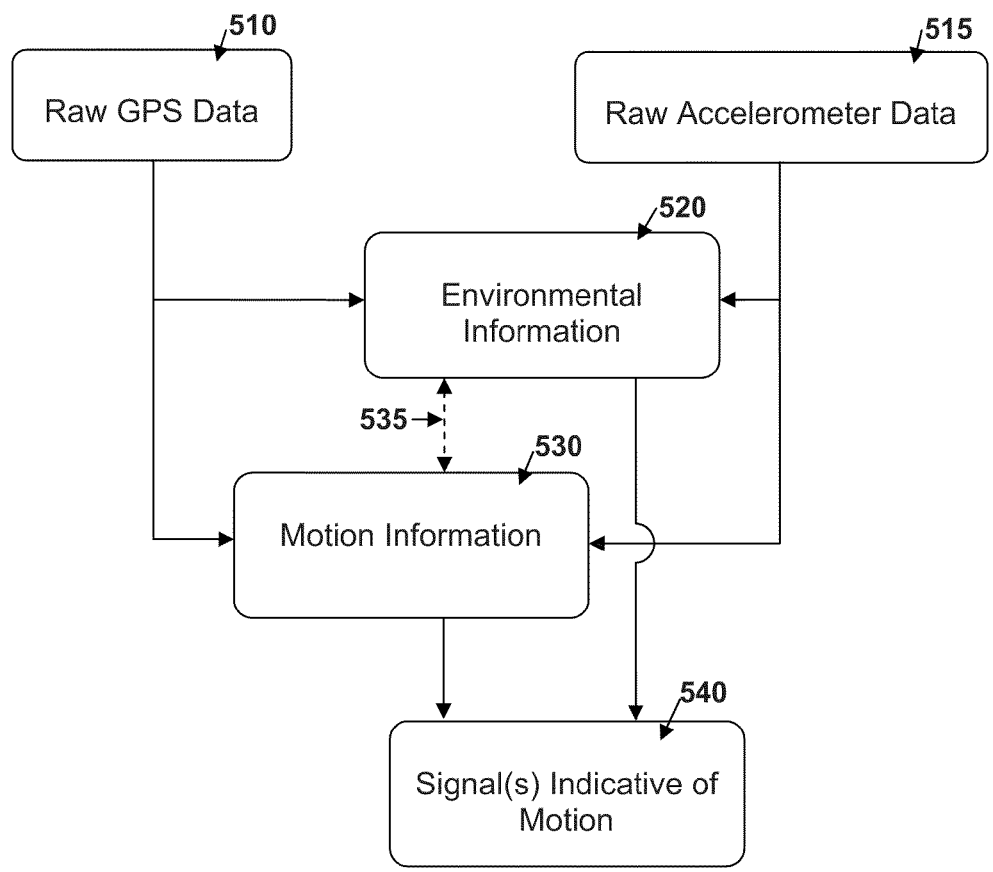
FIG. 5 illustrates a flow diagram for generating signals indicative of motion of a mobile wireless communication device in accordance with embodiments of the present technology.

FIG. 5 illustrates a flow diagram for generating one or more signals indicative of motion 540 of a mobile wireless communication device from raw GPS data 510 and raw accelerometer data 515, in accordance with embodiments of the present technology. For example, raw GPS data 510 may comprise a series of time-stamped indications of geographic position of a mobile wireless communication device, raw accelerometer data 515 may comprise a series of time-stamped acceleration values, average acceleration values, or the like. The one or more signals indicative of motion 540 may comprise environmental information 520, for example indicative of an environment in which the mobile wireless communication device resides, quantitative or qualitative motion information 530, or a combination thereof.

In some embodiments, environmental information 520 may comprise an indication of whether the mobile wireless communication device is above ground or underground. Environmental information may include an indication of a most likely environment of the mobile wireless communication device, a measure of probability of being in one or more environments, or the like. In some embodiments, determining whether the mobile wireless communication device is above ground or underground may comprise determining the presence or absence, or other relative strength or abundance, of current raw GPS data. For example, if the GPS receiver associated with the mobile wireless communication device is currently receiving few or no satellite signals, the probability of the mobile wireless communication device being indoors or underground may be inferred to be higher than if relatively more satellite signals were being received. In some embodiments, if location data is not generated by the GPS receiver, it may be inferred that few or no satellite signals are being received. Alternatively, if the GPS receiver is receiving signals from one or more satellites, the probability of being outdoors or indoors and near a window may be inferred to be higher than if no signals are received. In some embodiments, the number of satellites from which signals are received by the GPS receiver, or the angle subtended by the collection of satellites for which signals are received by the GPS receiver, may also be a factor in inferring environmental information. For example, if satellite signals are being received from a variety of directions, the probability of the mobile wireless communication device being outdoors may be inferred to be higher relative to other situations, whereas if satellite signals are being received only from satellites in a limited region of the sky, the probability of the mobile wireless communication device being near a window, or in an urban canyon or depression in the ground, may be inferred to be higher relative to other situations. If the mobile wireless communication device is determined to at least possibly be above ground, environmental information 520 may comprise an indication of topography of the above-ground or outdoor environment.

If the mobile wireless communication device is determined to at least possibly be underground, environmental information 520 may comprise an indication of whether the mobile wireless communication device is in a building, a tunnel, or another structure. For example, if processed accelerometer data indicates that the mobile wireless communication device is moving along a substantially straight or curved trajectory, the mobile wireless communication device may be inferred to be in a tunnel. If the processed accelerometer data indicates that the mobile wireless communication device is moving within a relatively confined region, for example in closed trajectories or other trajectories indicative of a person moving within a building, the mobile wireless communication device may be inferred to be in a building. In some embodiments, motion information may be used in determining environmental information and vice versa, as indicated by arrow 535 in FIG. 5.

In some embodiments, motion information 530 may comprise information such as position, velocity, acceleration, periodicity of motion, size of region within which motion occurs, patterns of motion, or the like. For example, raw GPS position data may be substantially differentiated to determine velocity data, whereas raw accelerometer data may be substantially integrated to determine velocity data, for example relative to an initial velocity. Motion information may also be derived from other motion sensor sources, or from a combination of sources.

In embodiments of the present technology, operations illustrated in FIG. 5 may be performed at least in part by a microprocessor or computer associated with a mobile wireless communication device, a base station, or a combination thereof. In some embodiments, raw GPS data 510, raw accelerometer data 515, or both, are partially processed by the mobile wireless communication device and transmitted to the base station, where further processing is performed.

EXAMPLE 3

Figure 6:
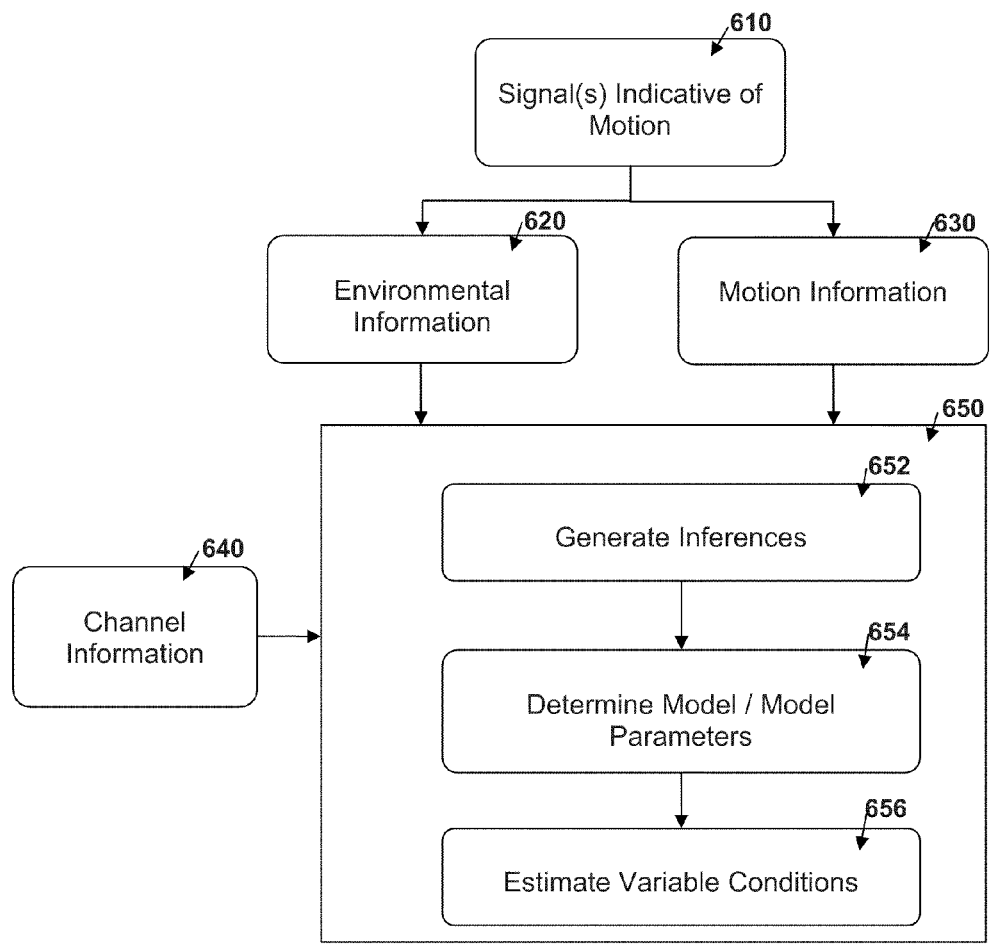
FIG. 6 illustrates a flow diagram for generating estimates of variable conditions of the common radio medium in accordance with embodiments of the present technology.

FIG. 6 illustrates a flow diagram for generating estimates 650 of variable conditions of the common radio medium between a mobile wireless communication device and a base station, based at least in part on one or more signals indicative of motion 610 of the mobile wireless communication device, such as environmental information 620, motion information 630, or a combination thereof, in accordance with embodiments of the present technology. Estimation 650 may further be based on additional measured channel information 640, such as channel quality indicators, signal strength, bit-error rates, signal-to-noise ratios, or the like, or a combination thereof. Generating estimates 650 of variable conditions may comprise generating inferences 652 related to estimated or predicted behaviour of the variable conditions. For example, based on a hard or soft decision about whether the mobile wireless communication device is underground, above ground, in an open or rural environment, urban canyon, or the like, an appropriate type of multipath radio environment with attendant variable conditions may be inferred. Generating estimates 650 of variable conditions may also comprise determining 654 an appropriate model or model parameters for use in estimating the variable conditions. For example, a Rayleigh, Rician, Weibull, Nakagami, or other fading channel model may be selected for modeling and estimating the variable conditions depending on estimates or inferences 652 about the mobile environment. As another example, based on velocity of the mobile wireless communication device, parameters of a fading model, such as fade rate, maximum Doppler shift, signal levels, or the like, may be determined. Based on the generated inferences, determined model and model parameters, variable channel conditions, such as signal strength, fading rates, expected fading times or durations, estimated periodicity of fading events, or the like, may be estimated 656.

Although in some implementations of the present technology GPS receivers are used to determine the current location, motion, or both, or the like, of each mobile wireless communication device, it should be appreciated that other techniques can be used to determine the current location, motion, or both to a degree of accuracy commensurate with the technique used. For example, cell tower triangulation or radiolocation techniques, as mentioned above, can be used to generate location or motion information, or both, for the mobile wireless communication device. Alternatively, the identity (and location) of the cell tower handling the mobile wireless communication device's communications can be used as a proxy for the location of the mobile wireless communication device, and a change in cell towers handling the mobile wireless communication device's communication over time can be used as a proxy for motion of the mobile wireless communication device. Another approach would be to prompt the user of the mobile wireless communication device to enter his or her current location (e.g. entering a street address, picking a POI from a map or selecting the current location using crosshairs on a map). A sequence of location inputs may be used to determine motion. As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning. Yet another approach is to use an accelerometer or other internal motion-sensing device to determine motion of the mobile wireless communication device.

This technology has been described in terms of specific implementations and configurations (and variants thereof) which are intended to be exemplary only. The scope of the exclusive right sought by the applicant is therefore intended to be limited solely by the appended claims.

The invention claimed is:

1. A method for scheduling wireless communication over a common radio medium between a base station and a mobile wireless communication device, the common radio medium exhibiting one or more variable conditions, the method comprising:
   obtaining one or more signals indicative of motion of the mobile wireless communication device, at least one of the one or more signals indicative of motion being generated by the mobile wireless communication device and communicated wirelessly to the base station;
   selecting an estimation process from a plurality of estimation processes in response to at least one of said one or more signals indicative of motion;
   predicting fading events including frequency and duration thereof based on the selected estimation process; and
   scheduling use of the common radio medium to facilitate wireless communications with the mobile wireless communication device, wherein said scheduling comprises scheduling use of time slots which do not temporally coincide with one or more of the predicted fading events.

2. The method according to claim 1, wherein the selected estimation process is a multipath reflector model, and wherein variation in parameters of the multipath reflector model depends at least in part on at least one of said one or more signals indicative of motion.

3. The method according to claim 1, wherein at least one of the one or more signals indicative of motion is indicative of a velocity of the mobile wireless communication device, and wherein predicting fading events comprises:
   configuring the selected estimation process as a model for estimating at least one of the one or more variable conditions of the common radio medium based on the determined velocity; and
   estimating said at least one of the one or more variable conditions based at least in part on said model.

4. The method according to claim 1, wherein at least one of the one or more signals indicative of motion is indicative of location information of the mobile wireless communication device.

5. The method according to claim 4, wherein said location information is indicative of whether the mobile wireless communication device is indoors or outdoors, and wherein scheduling use of the common radio medium for communication with the mobile wireless communication device is configured based at least in part on a determination of whether the mobile wireless communication device is indoors or outdoors.

6. The method according to claim 1, wherein the one or more variable conditions comprise one or more signal-to-noise ratios variable due to multipath fading.

7. The method according to claim 1, wherein scheduling use of the common radio medium comprises opportunistic scheduling.

8. The method according to claim 1, wherein scheduling use of the common radio medium comprises scheduling use of one or more resource blocks.

9. The method according to claim 1, wherein at least one of the one or more signals indicative of motion is based at least in part on GPS receiver data.

10. The method according to claim 1, wherein at least one of the one or more signals indicative of motion is based at least in part on accelerometer data.

11. The method according to claim 1, wherein the one or more signals indicative of motion comprise information indicative of motion of the mobile device and environmental information indicative of an environment of the mobile wireless communication device, wherein the information indicative of motion is used in determining the environmental information.

12. The method according to claim 1, wherein the one or more signals indicative of motion comprise velocity information, and wherein predicting fading events including frequency and duration thereof comprises providing said velocity information as input to a channel model.

13. An apparatus for scheduling wireless communication over a common radio medium between a base station and a mobile wireless communication device, the common radio medium exhibiting one or more variable conditions, the apparatus comprising:
   a motion tracking module configured to obtain one or more signals indicative of motion of the mobile wireless communication device, at least one of the one or more signals indicative of motion being generated by the mobile wireless communication device and communicated wirelessly to the base station;
   an estimation module configured to select an estimation process from a plurality of estimation processes in response to at least one of said one or more signals indicative of motion, and to predict fading events including frequency and duration thereof based on the selected estimation process; and
   a scheduling module operatively coupled to the motion tracking module, the scheduling module configured to schedule use of said common radio medium to facilitate wireless communications with the mobile wireless communication device, wherein said scheduling comprises scheduling use of time slots which do not temporally coincide with one or more of the predicted fading events.

14. The apparatus according to claim 13, wherein at least one of the one or more signals indicative of motion is indicative of a velocity of the mobile wireless communication device, and wherein the estimation module is configured to:
   configure the selected estimation process as a model for estimating at least one of the one or more variable conditions of the common radio medium based on the determined velocity; and
   estimate said at least one of the one or more variable conditions based at least in part on said model.

15. The apparatus according to claim 13, wherein the motion tracking module is configured to determine location information of the mobile wireless communication device based on at least one of the one or more signals indicative of motion.

16. The apparatus according to claim 15, wherein said location information is indicative of whether the mobile wireless communication device is indoors or outdoors, and wherein the scheduling module is configured to schedule use of said common radio medium based at least in part on a determination of whether the predetermined mobile wireless communication device is indoors or outdoors.

17. The apparatus according to claim 13, wherein the one or more variable conditions comprise one or more signal-to-noise ratios variable due to multipath fading.

18. The apparatus according to claim 13, wherein the scheduling module is configured to perform opportunistic scheduling.

19. The apparatus according to claim 13, wherein the scheduling module is configured to schedule use of resource blocks.

20. The apparatus according to claim 13, wherein at least one of the one or more signals indicative of motion is generated at least in part from GPS receiver data.

21. The apparatus according to claim 13, wherein at least one of the one or more signals indicative of motion is generated at least in part from accelerometer data.

22. A computer program product comprising code which, when loaded into memory and executed on a processor of a wireless communication device, is adapted for scheduling wireless communication over a common radio medium between a base station and a mobile wireless communication device, the common radio medium exhibiting one or more variable conditions, the computer program product adapted to:
- obtain one or more signals indicative of motion of the mobile wireless communication device, at least one of the one or more signals indicative of motion being generated by the mobile wireless communication and communicated wirelessly to the base station; and
- select an estimation process from a plurality of estimation processes in response to at least one of said one or more signals indicative of motion;
- predict fading events including frequency and duration thereof based on the one or more signals indicative of motion; and
- schedule use of said common radio medium to facilitate wireless communication with the mobile wireless communication device, wherein said scheduling comprises scheduling use of time slots which do not temporally coincide with one or more of the predicted fading events.

* * * * *